United States Patent
Kluzner et al.

(10) Patent No.: US 8,687,916 B2
(45) Date of Patent: Apr. 1, 2014

(54) CORRECTING PAGE CURL IN SCANNED BOOKS

(71) Applicant: International Business Machines Corporation, Armonk, NY (US)

(72) Inventors: Vladimir Kluzner, Haifa (IL); Asaf Tzadok, Haifa (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/654,624

(22) Filed: Oct. 18, 2012

(65) Prior Publication Data

US 2013/0039598 A1 Feb. 14, 2013

Related U.S. Application Data

(63) Continuation of application No. 12/795,809, filed on Jun. 8, 2010, now abandoned.

(51) Int. Cl.
*G06K 9/40* (2006.01)
*H04N 1/40* (2006.01)

(52) U.S. Cl.
USPC ........................................ 382/275; 358/3.28

(58) Field of Classification Search
USPC ........................................ 382/275; 358/3.28
See application file for complete search history.

(56) References Cited

U.S. PATENT DOCUMENTS

| | | | | |
|---|---|---|---|---|
| 6,954,290 | B1 * | 10/2005 | Braudaway et al. | 358/3.26 |
| 6,996,290 | B2 * | 2/2006 | Cariffe | 382/275 |
| 7,016,081 | B2 * | 3/2006 | Araki et al. | 358/3.26 |
| 7,079,265 | B2 * | 7/2006 | Horie | 358/1.12 |
| 7,170,644 | B2 * | 1/2007 | Loce et al. | 358/3.26 |
| 7,330,604 | B2 * | 2/2008 | Wu et al. | 382/289 |
| 7,430,065 | B2 * | 9/2008 | Arakai et al. | 358/3.26 |
| 7,471,848 | B2 * | 12/2008 | Fujimoto et al. | 382/275 |
| 7,508,978 | B1 | 3/2009 | Lefevere et al. | |
| 7,602,995 | B2 * | 10/2009 | Araki et al. | 382/290 |
| 7,903,874 | B2 * | 3/2011 | Fujimoto et al. | 382/174 |
| 8,045,804 | B2 * | 10/2011 | Zeng et al. | 382/188 |

(Continued)

OTHER PUBLICATIONS

V. Kluzner, A. Tzadok, Y. Shimony, E. Walach, A. Antonacopoulos, "Word-Based Adaptive OCR for Historical Books", In Proceedings of 10th International Conference on Document Analysis and Recognition, Barcelona, Spain, Jul. 2009.

(Continued)

*Primary Examiner* — Wenpeng Chen

(57) ABSTRACT

A computer implemented method for correcting distortion in an image of a page includes identifying a set of high quality (HQ) words in undistorted regions of one or more images of pages having content related to the content of the page. At least one distorted word in the image the page is identified such that each distorted word corresponds to a high quality word of the set. A global transformation function is generated for application to the image of the page so as to transform the distorted word into its corresponding high quality word. The global transformation function is applied to pixels of the image of the page.

21 Claims, 4 Drawing Sheets

(56) References Cited

U.S. PATENT DOCUMENTS

| | | | |
|---|---|---|---|
| 8,107,766 B2 * | 1/2012 | Kacher et al. | 382/275 |
| 8,406,476 B2 * | 3/2013 | Wu et al. | 382/112 |
| 2006/0140504 A1 * | 6/2006 | Fujimoto et al. | 382/275 |
| 2008/0205759 A1 * | 8/2008 | Zandifar et al. | 382/177 |
| 2009/0016606 A1 * | 1/2009 | Meyer et al. | 382/176 |
| 2009/0252439 A1 * | 10/2009 | Kacher et al. | 382/317 |
| 2009/0324119 A1 | 12/2009 | Rosman et al. | |
| 2011/0299775 A1 * | 12/2011 | Kluzner et al. | 382/173 |

OTHER PUBLICATIONS

S. S. Beuchemin and J. L. Barron., "The computation of optical flow". ACM Computing Surveys, 27:433-467, 1995.

B. K. P. Horn and B. G. Schunck. "Determining optical flow". Artificial Intelligence, 17:185-203, 1981.

J. P. Lewis., "Fast template matching". Vision Interface, pp. 120-123, 1995.

* cited by examiner

CORRECTING PAGE CURL IN SCANNED BOOKS

CROSS-REFERENCE TO RELATED APPLICATION

This application is a continuation application of U.S. patent application Ser. No. 12/795,809 entitled, "CORRECTING PAGE CURL IN SCANNED BOOKS", filed on Jun. 8, 2010 now abandoned and is assigned to the same assignee in the present application, contents of which are incorporated by reference herein in its entirety.

BACKGROUND

The present invention relates to book digitization. More specifically the present invention relates to correcting digital scan data of a curled page, such as in the vicinity of the book spine, or other distortion of the page.

There is a large amount of information contained in printed material. Printed material may include books, as well as newspapers, journals, magazines, pamphlets, and other periodical literature. However, access to such material, as well as storage space for such material, may often be limited. For example, due to the rarity as well as, often, the fragility of some material, such as some older books and publications, an institution that holds the material, such as a library, museum, or private owner, may be reluctant to lend the book to individuals or other institutions. Thus, a researcher or other interested individual who wishes to access such material may have to travel to the location of the material. Even so, access may be limited to a limited period of time or to viewing under special conditions. In addition, some publications, such as newspapers and popular magazines may deteriorate quickly. In addition, storage space at an institution may be limited.

Therefore, there has been much interest in digitizing the contents of rare books, as well as other printed material. A digitized version of the material may then be made available to a much larger segment of the population than had access to the original book. In addition, there is much interest in making available to the public in digital form a wide variety of books and publications that are out of print. (Hereinafter, printed material to be digitized will be referred to as a "book," regardless of its actual form.)

In digitization, each page or pair of pages of the book is scanned to acquire as series of digitized images of the pages. The digitized images may then be saved in a digital format. The digitized images of the book may be made available to the public either in the form of a digital file, or as reprinted in the form of a facsimile edition of the book.

The acquired digitized images may be further processed to extract the textual contents of the book. For example, optical character recognition (OCR) technology may be applied to the scanned pages in order to create a text file of the textual contents of the book. The contents of the book may thus be made available to the public in the form of a text file.

A frequent obstacle to cost-effective digitization of an old book is the distortion of page images due to bending or curling of the pages. Depending on how a book is bound, the book may not open flat. In such a case, the ends of the pages near the binding may curled or bent.

When scanned with a scanner designed primarily for scanning flat objects, a digitized image of a curled end of the page may appear distorted. Text on the curled portion of the page may be tilted with respect to the line of sight of the scanner. The symbols or letters of the text may be distorted such that they may be difficult to read. In addition, the distortion of the letters may render the letters unrecognizable by standard OCR technology.

Often, various considerations preclude disassembling the binding of the book, or applying pressure to the book, in order to cause the pages to lie flat. Using special cameras or scanning techniques in order to scan around the curvature of the page may significantly increase the time and expense required to digitize the book. Such an increase in time and expense may seriously impede progress in digitizing whole libraries and collections of rare books.

SUMMARY

According to embodiments of the present invention there is provided a computer implemented method for correcting distortion in an image of a page with a content. The method includes: identifying a set of high quality words including at least one high quality word in an undistorted region of one or more images of one or more pages having content related to the content of the page; identifying at least one distorted word in the image the page, each distorted word of said at least one distorted word corresponding to a high quality word from the set of high quality words; generating a global transformation function for application to the image of the page so as to substantially transform a distorted word of said at least one distorted word to its corresponding high quality word; and applying the global transformation function to pixels of the image of the page.

There is further provided, in accordance with embodiments of the present invention, a computer program product stored on a non-transitory tangible computer readable storage medium for correcting distortion in an image of a page with a content. The computer program includes code for: identifying a set of high quality words including at least one high quality word in an undistorted region of one or more images of one or more pages having content related to the content of the page; identifying at least one distorted word in the image the page, each distorted word of said at least one distorted word corresponding to a high quality word from the set of high quality words; generating a global transformation function for application to the image of the page so as to substantially transform a distorted word of said at least one distorted word to its corresponding high quality word; and applying the global transformation function to pixels of the image of the page.

There is further provided, in accordance with embodiments of the present invention, a data processing system including: a processor; a computer usable medium connected to processor, wherein the computer usable medium contains a set of instructions for correcting distortion in an image of a page with a content. The processor is designed to carry out a set of instructions to: identify a set of high quality words including at least one high quality word in an undistorted region of one or more images of one or more pages having content related to the content of the page; identify at least one distorted word in the image the page, each distorted word of said at least one distorted word corresponding to a high quality word from the set of high quality words; generate a global transformation function for application to the image of the page so as to substantially transform a distorted word of said at least one distorted word to its corresponding high quality word; and apply the global transformation function to pixels of the image of the page.

BRIEF DESCRIPTION OF THE SEVERAL VIEWS THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
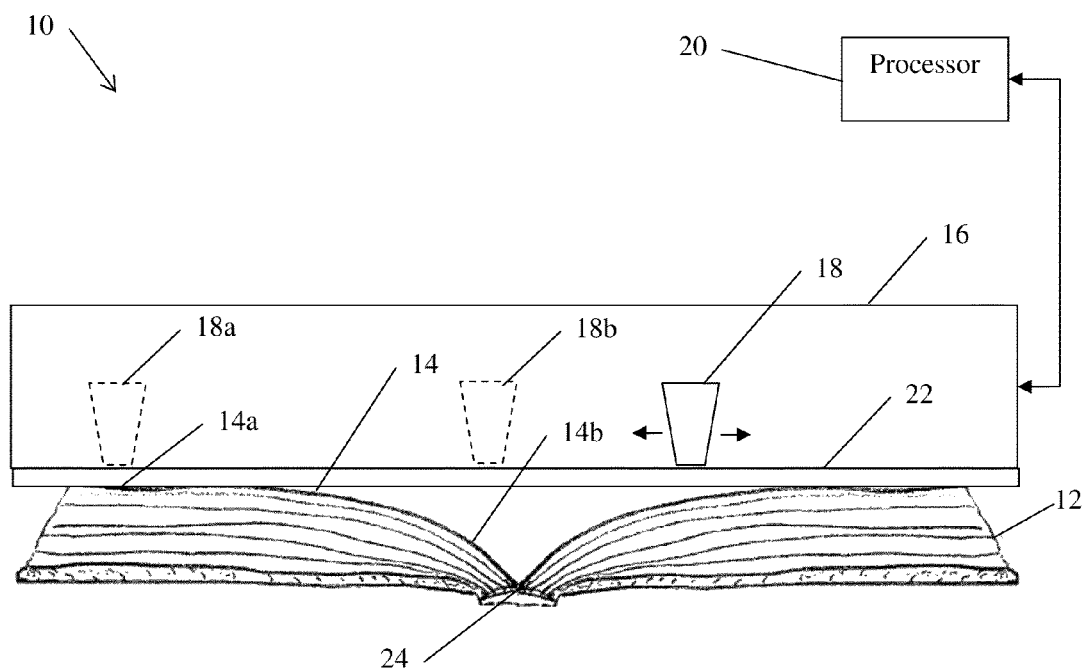
FIG. 1 shows a schematic cross-sectional image of a system for correction of distorted images of a page of a book, in accordance with embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with embodiments of the present invention, it is proposed to correct distortion of an image of a page of a book on the basis of undistorted images of other parts of the same book. Typically, distortion of a page may result from a flatbed or similar planar scanner scanning a curled part of the page. A correction application in accordance with embodiments of the present invention may enable obtaining a corrected, flattened, image of a curled page using standard, off the shelf, scanning equipment.

The correction application includes taking advantage of undistorted scanned images of all or part of the remainder of the book to determine the likely content of at least a portion of the distorted image. For example, the correction application may search scanned pages of the book for typical content that typifies the contents of the book being scanned. For example, the typical content may include words, sequences of words, clusters of words, or symbols that appear repeatedly at various points in the text. The correction application may then identify an item of the image content that appears to be a distortion of one or more items of the typical content. For example, the correction application may identify a section of text as being a distorted version of a word of the typical content.

The correction application may, on the basis of the assumption that the identified item of the image content is a distorted version of an item of the typical content, construct a local transformation. The local transformation may describe the distortion of the item of typical content to form the identified item of the image content.

After determining one or more local transformations on the page, the correction application may then construct a global transformation function that describes the transformation of the entire page. For example, the global transformation function may describe a transformation of an image of a bent page to an image of an flat page with equivalent content. Thus, the global transformation function may convert distorted content of the image to the assumed true content of the page. For example, the correction application may calculate the best fit of an image of a distorted page to a particular mathematical model. For example, the correction application may apply a least squares fit algorithm to fit the distorted content to a polynomial function. Alternatively, the correction application may fit the distorted content to a model based on a physical model of an open book.

After determining transformation function, the correction application may apply the transformation function to the image of the page. Application of the transformation function to the image of the page may result in an undistorted image of the page.

FIG. 1 shows a schematic cross-sectional image of a system for correction of distorted images of a page of a book, in accordance with embodiments of the present invention. System 10 includes scanner 16 and processor 20. Scanner 16 may include a platen 22. For example, book 12 may be opened so as to press exposed page 14 against platen 22. Book 12 includes binding 24 for binding the pages of book 12 together. Binding 24 may constrain the shapes of pages of book 12 when book 12 is open. For example, binding 24 may hold exposed page 14 in book 12 in such a manner that when book 12 is open, proximal section 14b of page 14, proximal to binding 24, is curved. Therefore, at least part of proximal section 14b may lie at a distance from, and at an oblique angle to, platen 22. Typically another distal section 14a of page 14, distal to binding 24, may lie substantially flat against platen 22.

During scanning, scanner 10 typically moves scanner head 18 along platen 22 so as to scan various parts of exposed page 14. Typically, scanner head 18 is elongated in a direction perpendicular to its direction of motion, represented by the arrows in the FIG. 1, and perpendicular to the plane of the Figure. For example, when at scanner head position 18a, scanner head 18 may image a substantially flat distal section 14a of exposed page 14. Similarly, when at scanner head position 18b, scanner 18 may image a distorted proximal section 14b of exposed page 14.

Processor 20 may include programming for controlling the operation of scanner 16. For example, processor 20 may control movement of scanner head 18 as well as acquisition of scan data by scanner head 18. Processor 20 may include programming for receiving scan data from scanner 18, as well as for analyzing, processing, and outputting the scan results. For example, processor 20 may represent a processor built into scanner 16, a computer communicating with scanner 16, or a combination of various processors communicating with one another and with scanner 16.

Figure 2:
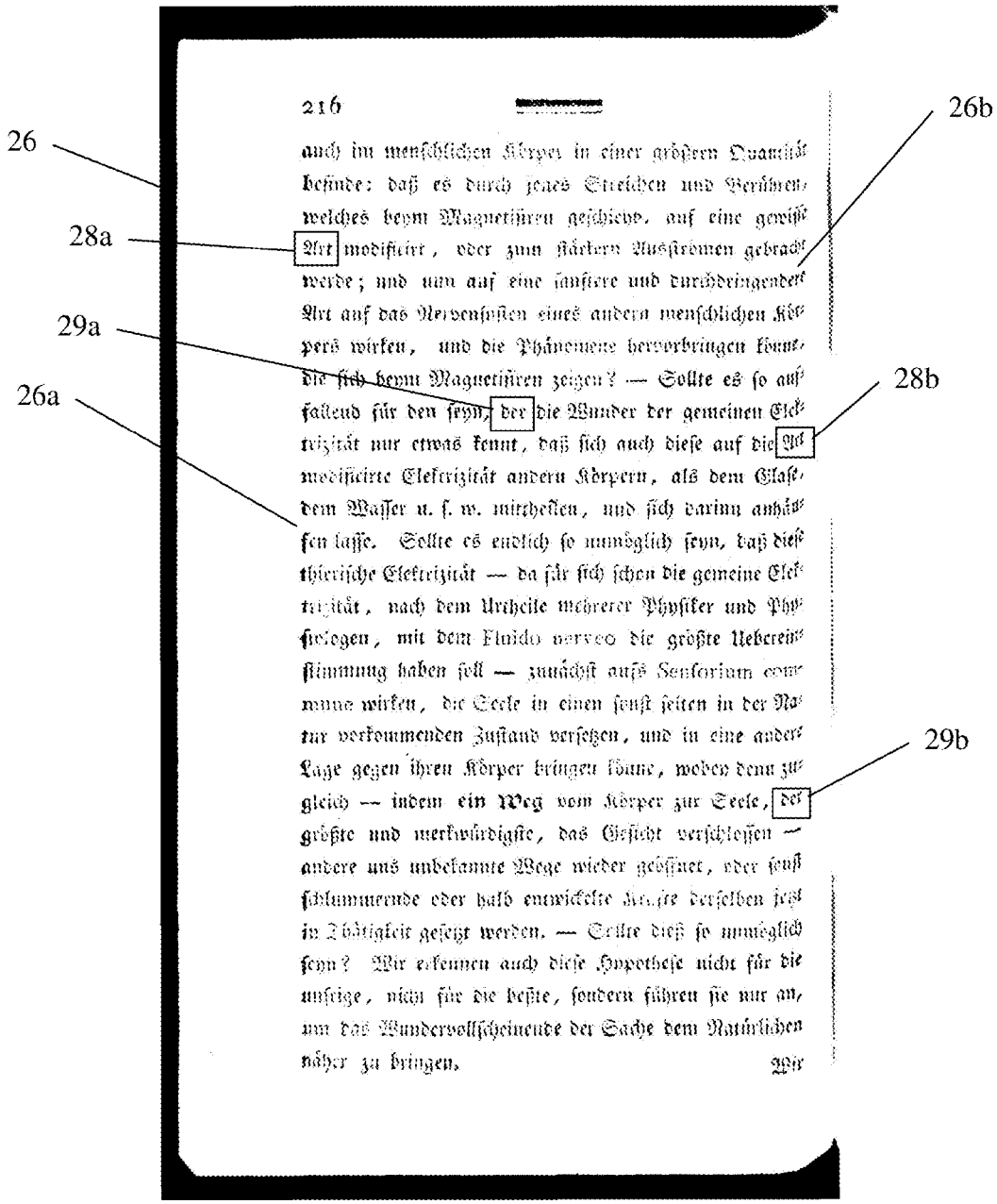
FIG. 2 shows an example of an image of a page scanned with the system shown in FIG. 1.

FIG. 2 shows an example of an image of a page scanned with the system shown in FIG. 1. Page image 26 includes an undistorted image region 26a, corresponding to an image of distal section 14a of exposed page 14 (FIG. 1). Similarly, page image 26 includes a distorted image region 26b, corresponding to an image of proximal section 14b of exposed page 14 (FIG. 1).

A correction application running on processor 20 (FIG. 1) may apply techniques known in the art to identify individual image content components, such as individual words, symbols, or clusters of symbols, within the image. Hereinafter, an individual image content component will be referred to as a word, regardless of the content of the component. Such techniques are known and applied, for example, in OCR technology. For example, a technique may identify individual words by identifying the spaces separating the words from one another. For example, a correction application may identify undistorted words 28a and 29a in undistorted image region 26a. Similarly, the correction application may identify distorted words 28b and 29b in distorted image region 26b.

Figure 3:
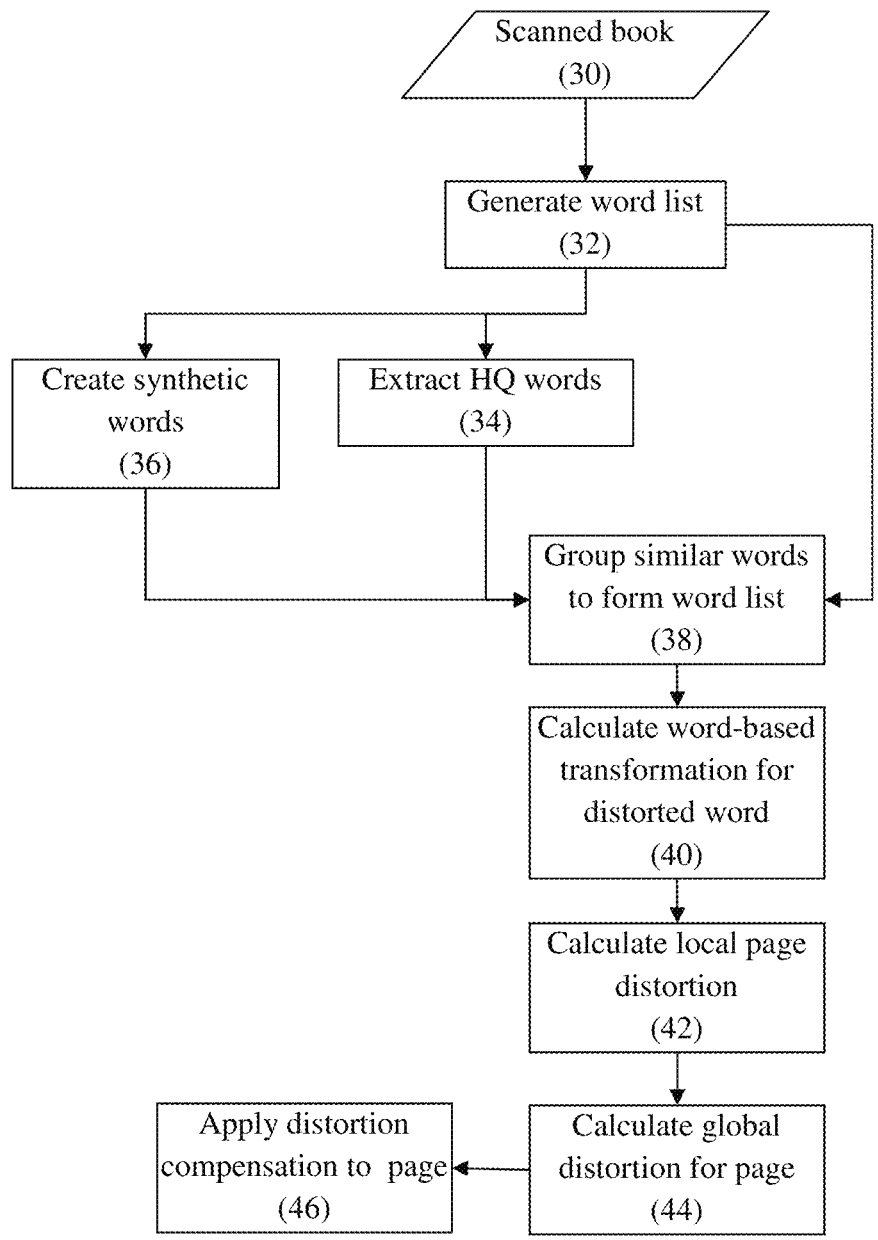
FIG. 3 is a flow chart for a method of correcting distorted page images in accordance with embodiments of the present invention.

FIG. 3 is a flow chart for a method of correcting distorted page images in accordance with embodiments of the present invention. A correction application in accordance with embodiments of the present invention uses as input an appropriate set of page scan images (step 30). The input set of page scan images typically includes images of a set of scanned pages with related or approximately uniform content. For example, the input set may include all of the pages of a book. In other cases, the input set may include a subset of the page images of the book. For example, different sections of a scanned book may be written in different languages, may be printed in different fonts, or may have very different styles (e.g. a mathematical section consisting largely of equations and another section primarily including narration). In such a case, the correction application input may be limited to one or more sections with approximately uniform content. For example, a user of the application may indicate the images to be used as input. Alternatively, a correction application may include criteria for identifying such sections containing approximately uniform content.

The correction application may then generate a list of words present in the input set (step 32). For example, the correction may include applying known word segmentation techniques of OCR to segment each image into separate words (e.g. by identifying spaces the spaces that separate the words from one another). For example, the correction application operating on page image 26 (FIG. 2) may identify words 28a, 28b, 29a, and 29b (among others).

The correction application may analyze the generated list of words so as to correct the page distortion. Typically, the correction application may assume that the words are bi-tonal (e.g. uniformly dark text on a light background). Fading or discoloration of the print, darkening or discoloration of the page, or other effects, may hinder defining the edges of the words. In order to eliminate any grayscale or other shading in the scanned image, the correction algorithm may apply a standard binarization technique to the words. A typical binarization technique may apply one or more fixed or adaptable thresholds to an image in order to assign to each pixel of the image one of two values (e.g. a value indicating black or a value indicating white). In addition, the correction application may apply a low pass spatial filter (e.g. a Gaussian 3×3 filter) to eliminate high spatial frequency components, further defining the edges of words or characters.

Analysis may include identifying a set of high quality (HQ) words (step 34) within the list of words. HQ words are words identifiable as being substantially undistorted. For example, application of standard OCR techniques to a word may yield an OCR interpretation of the word with a high degree of confidence. The correction application may then determine that the interpreted word is an HQ word. Such a technique may be limited to a word in a known language or printed with a known font. Alternatively, the correction application may apply standard baseline determination techniques to the word in order to determine the general shape of the word. The correction application may determine that a word with a substantially straight baseline is an HQ word. For example, the correction application operating on page image 26 (FIG. 2) may identify HQ words 28a and 29a (among others). On the other hand, the correction application may identify words 28b and 29b as non-HQ words.

Analysis may also include creation of synthetic words (step 36). For example, the language or font of letters making up the words may be known, or may be extractable from the list of words. The correction application may then create words using the letters of the font. For example, the correction application may use synthetic words for later comparison with distorted words (described below).

The correction application may then match similar words and arrange them into groups of equivalent words (step 38). For example, the correction application may apply known shape analysis or OCR techniques to HQ words in a straightforward manner in order to identify similar words. For words that are slightly misaligned due to translation or rotation of the word as a whole, the correction application may first apply one or more known registration techniques. Such techniques may include, for example, minimizing one or more distance measurements, or maximizing a correlation between the words.

The correction application may apply additional analysis for matching distorted or other non-HQ words with HQ or synthetic words. For example, the correction application may attempt to compare a distorted word with an HQ word. For example, the correction application may compare overall dimensions or other gross features of the distorted word with those of the HQ words in the list of words. As a result of the comparison, the correction application may identify candidate words of which the distorted word may be a distorted version.

After identifying a list of candidate words, the correction application may apply various techniques to attempt to match the distorted word to one or more of the candidate words. For example, the correction application may apply a known registration technique as described above in order to maximize alignment of the distorted word with the candidate HQ word.

In addition, the correction application may apply one or more (non-rigid) elastic registration techniques, as are known in the art. An elastic registration technique may attempt to modify the shape of the distorted word so as to match the shape of the candidate HQ word.

For example, the correction application may apply an optical flow technique such as a motion estimation technique. In applying a motion estimation technique, the correction application generates a distortion matrix. The distortion matrix describes a deformation that when applied to the HQ word, warps the image so as to obtain the distorted word (or vice versa). A distortion matrix includes a displacement vector assigned to each pixel of the HQ word. Each displacement vector describes a motion (distance and direction) to be applied to each pixel of the HQ word in order to warp the image so as to form the distorted word.

Figure 4:
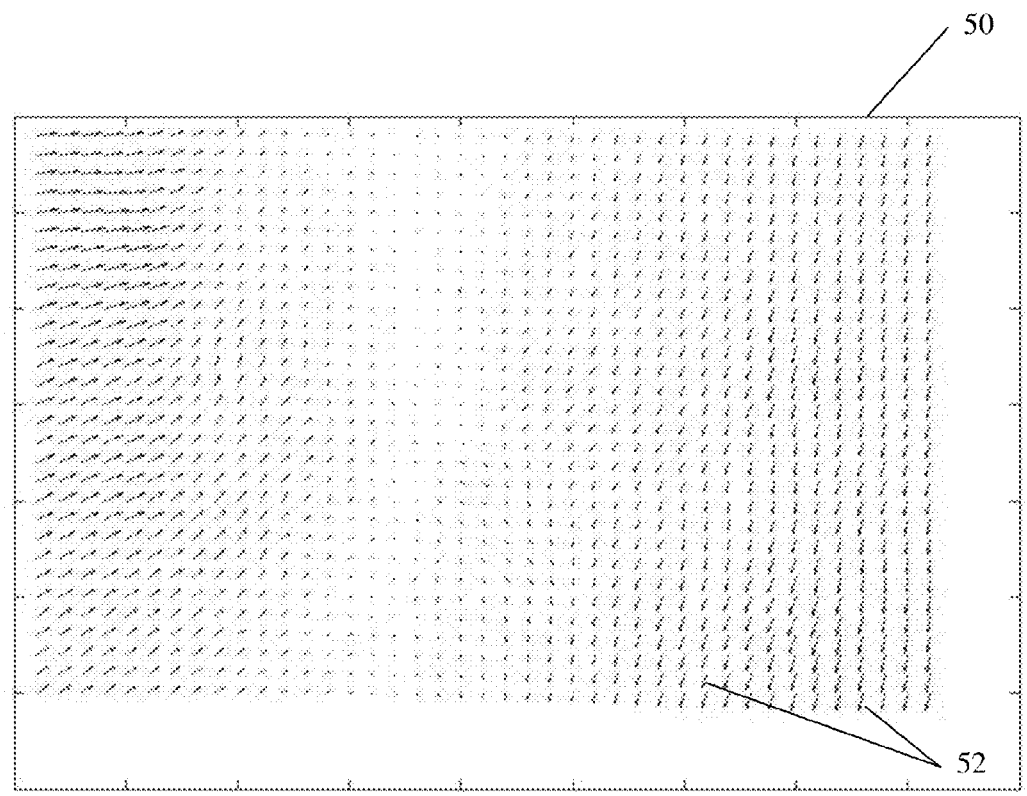
FIG. 4 is a schematic diagram of a distortion matrix.

Typically, the correction application generates a distortion matrix by applying a variational technique such that the generated distortion matrix describes a best correspondence. Typically, the correction application selects a distortion matrix such that a criterion quantity describing the degree of correspondence between pixels of the HQ word and the distorted word is maximized or minimized. Failure to obtain a value of the criterion quantity within a predefined range of values may indicate lack of correspondence between the HQ word and the distorted word. FIG. 4 is a schematic diagram of a distortion matrix. Each arrow 52 of distortion matrix 50 represents a displacement vector assigned to a pixel.

Alternatively, the correction application may approximate a distortion matrix by a distortion function. For example, the correction application may fit a polynomial or other suitable transformation function to the HQ word so as to distort the HQ word to an image similar to the distorted word. Typically, the fit may include two polynomial functions, each describing the distortion in one of two orthogonal directions (e.g. x and y directions). For example, the correction application may fit a polynomial function to a distortion matrix.

The correction application, may apply a correction based on the distortion matrix or distortion function (such as the inverse of the distortion matrix or distortion function) to the distorted word in order to obtain a corrected image.

Thus, the correction application may calculate a word-based correction transformation for transforming a distorted word to an undistorted word (step 40). Thus, the correction application may generate a set of distorted words on each page of the scanned book that correspond to known words of the list of words. Each distorted word may have an associated distortion matrix or distortion function. For example, the correction application operating on page image 26 (FIG. 2) may identify distorted word 28b as a distortion of undistorted word 28a, and distorted word 29b as a distortion of undistorted word 29a.

Based on the correction transformation, the correction application may calculate a local transformation for the section of the page in which the distorted word is found (step 42). For example, the correction may generate a local polynomial function describing the local distortion at the distorted word. Typically, the function may include two polynomial functions, each describing the distortion in one of two orthogonal directions (e.g. x and y directions).

The correction application may use the set of local transformation functions associated with a single page to generate a function describing the global distortion of the page (step 44). For example, the correction application may generate a polynomial function that describes the global distortion of the entire page or of a section of the page containing the distortion. The correction application may fit a single polynomial function (in each of the two orthogonal directions) to a set of local polynomial functions. For example, the correction application may apply least squares techniques to generate the best fit.

Alternatively, a correction application in accordance with embodiments of the present invention may employ an alternative technique for generating a global distortion function to describe the global distortion of page. For example, a physical model may exist for the shape of the surface of a page of an open book. For example, a general model may exist for a book having parameters with values within a predetermined range. Such parameters may include, for example, overall dimensions of the book, number of pages, page to which book is open, type of binding, paper thickness, and age of the book. The general model may include one or more parameters whose values may be determinable by fitting transformation functions of distorted words on the page to undistorted words.

The correction application may then derive a global correction function for a page from its associated global distortion function and apply the global correction function to the page (step 46). For example, the global correction function may be in inverse function of the global distortion function. Application of the global correction function may result in a corrected page image. A global correction function may reduce or eliminate the distortion of all distorted words on the page, whether or not associated with a local distortion function. Further processing of the corrected page image may include, for example, saving an image of the corrected page or applying an OCR to the content of the page.

Repeated application of the process may increase accuracy. For example, after application of a global distortion correction, application of OCR to the corrected pages may assist in identifying additional words that were missed previously. Adding the additionally identified words to the list of words and repeating the process with the expanded list of words may result in a more accurate distortion correction.

What is claimed is:

1. A computer implemented method for correcting distortion in an image of a page with a content, the method comprising:
    identifying a set of high quality words including at least one high quality word in an undistorted region of one or more images of one or more pages having content related to the content of the page;
    identifying at least one distorted word in the image of the page, each distorted word of said at least one distorted word corresponding to a high quality word from the set of high quality words;
    generating a global transformation function for application to the image of the page so as to transform a distorted word of said at least one distorted word to its corresponding high quality word; and
    applying the global transformation function to pixels of the image of the page.

2. A method as claimed in claim 1, wherein said at least one distorted word comprises at least two distorted words, and wherein generating a global transformation function for application to the image of the page comprises:
    generating at least two local transformation functions, each local transformation function of said at least two local transformation functions applicable to a corresponding distorted word of said at least two distorted words so as to transform the corresponding distorted word to its corresponding high quality word; and
    fitting a global function to said at least two local transformation functions.

3. A method as claimed in claim 2, wherein said at least two local transformation functions comprise polynomial functions.

4. A method as claimed in claim 1, wherein the global transformation function comprises a polynomial function.

5. A method as claimed in claim 1, wherein generating the global transformation function comprises application of an optical flow technique.

6. A method as claimed in claim 1, comprising segmenting the image of the page or said one or more images of one or more pages into words.

7. A method as claimed in claim 1, comprising applying a binarization technique to the image of the page or to said one or more images of one or more pages.

8. A method as claimed in claim 1, comprising code for applying a binarization technique to the image of the page or to said one or more images of one or more pages.

9. A computer program product stored on a non-transitory tangible computer readable storage medium for correcting distortion in an image of a page with a content, the computer program product including code for:
    identifying a set of high quality words including at least one high quality word in an undistorted region of one or more images of one or more pages having content related to the content of the page;
    identifying at least one distorted word in the image of the page, each distorted word of said at least one distorted word corresponding to a high quality word from the set of high quality words;
    generating a global transformation function for application to the image of the page so as to transform a distorted word of said at least one distorted word to its corresponding high quality word; and
    applying the global transformation function to pixels of the image of the page.

10. A computer program product as claimed in claim 9, wherein said at least one distorted word comprises at least two distorted words, and wherein the code for generating a global transformation function for application to the image of the page comprises code for:
    generating at least two local transformation functions, each local transformation function of said at least two local transformation functions applicable to a corresponding distorted word of said at least two distorted words so as to transform the corresponding distorted word to its corresponding high quality word; and
    fitting a global function to said at least two local transformation functions.

11. A computer program product as claimed in claim 10, wherein said at least two local transformation functions comprise polynomial functions.

12. A computer program product as claimed in claim 9, wherein the global transformation function comprises a polynomial function.

13. A computer program product as claimed in claim 9, wherein the code for generating the global transformation function comprises code for application of an optical flow technique.

14. A computer program product as claimed in claim 9, comprising code for segmenting the image of the page or said one or more images of one or more pages into words.

15. A data processing system comprising:
    a processor;
    a computer usable medium connected to processor, wherein the computer usable medium contains a set of instructions for correcting distortion in an image of a page with a content, wherein the processor is designed to carry out a set of instructions to:

identify a set of high quality words including at least one high quality word in an undistorted region of one or more images of one or more pages having content related to the content of the page;

identify at least one distorted word in the image of the page, each distorted word of said at least one distorted word corresponding to a high quality word from the set of high quality words;

generate a global transformation function for application to the image of the page so as to transform a distorted word of said at least one distorted word to its corresponding high quality word; and apply the global transformation function to pixels of the image of the page.

16. A data processing system as claimed in claim 15, wherein said at least one distorted word comprises at least two distorted words, and wherein the instructions to generate a global transformation function for application to the image of the page comprise instructions to:

generate at least two local transformation functions, each local transformation function of said at least two local transformation functions applicable to a corresponding distorted word of said at least two distorted words so as to transform the corresponding distorted word to its corresponding high quality word; and fit a global function to said at least two local transformation functions.

17. A data processing system as claimed in claim 16, wherein said at least two local transformation functions comprise polynomial functions.

18. A data processing system as claimed in claim 15, wherein the global transformation function comprises a polynomial function.

19. A data processing system as claimed in claim 15, wherein the instructions for generating the global transformation function comprise instructions to apply an optical flow technique.

20. A data processing system as claimed in claim 15, comprising instructions to segment the image of the page or said one or more images of one or more pages into words.

21. A data processing system as claimed in claim 15, comprising instructions to apply a binarization technique to the image of the page or to said one or more images of one or more pages.

* * * * *